United States Patent
Maurer et al.

[11] 3,884,550
[45] May 20, 1975

[54] GERMANIA CONTAINING OPTICAL WAVEGUIDE

[75] Inventors: Robert D. Maurer; Peter C. Schultz, both of Painted Post, N.Y.

[73] Assignee: Corning Glass Works, Corning, N.Y.

[22] Filed: Jan. 4, 1973

[21] Appl. No.: 320,943

[52] U.S. Cl. ............... 350/96 WG; 65/3; 65/DIG. 7; 106/50; 350/96 R
[51] Int. Cl. .............................................. G02b 5/14
[58] Field of Search ............ 350/96. WG; 106/74 Q

[56] References Cited
UNITED STATES PATENTS

| 3,434,774 | 10/1971 | Miller | 350/96 WG |
| 3,737,293 | 6/1973 | Maurer | 350/96 WG |
| 3,806,223 | 4/1974 | Keck et al. | 350/96 WG |

FOREIGN PATENTS OR APPLICATIONS

| 1,510,554 | 12/1967 | France | 35/96 WG |

OTHER PUBLICATIONS

Armed Services Technical Report AD235192 by Armour Research Foundation of Illinois Institute of Technology, Infrared Fiber Optics, pages 3–10, 18–20 relied on; received in Scientific Library May 22, 1961.
Chang et al. "Experimental Observation of 10.6 um Guided Waves in Ge thin Films" Applied Optics Vol. 10, No. 10, pp. 2361–2362, October 1971.

*Primary Examiner*—John K. Corbin
*Attorney, Agent, or Firm*—Walter S. Zebrowski; Clarence R. Patty, Jr.

[57] ABSTRACT

An optical waveguide having a cladding layer formed of high purity glass and a core of high purity germania containing glass having an index of refraction above that of the cladding layer, said high purity germania containing glass having a cation impurity level not exceeding 10 parts per million of transition elements and a germania content in excess of 15 percent by weight.

8 Claims, 5 Drawing Figures

GERMANIA CONTAINING OPTICAL WAVEGUIDE

FIELD OF THE INVENTION

Waveguides used in optical communications systems are herein referred to as "optical waveguides" and are normally constructed from a transparent dielectric material such as glass or plastic. Producing a satisfactory optical waveguide has been one of the more difficult problems in the development of an effective optical communications system.

Optical waveguides are a unique type of optical fiber in that many of the physical characteristics and parameters must be carefully coordinated. In the conventional optical fiber substantially all of the transmitted light is retained within the core, and the light transmission qualities of the cladding layer are therefore of little consequence. In order to prevent transmitted light from escaping the fiber, one of the more basic considerations in producing conventional optical fibers is that the index of refraction of the core be larger than the index of refraction of the cladding layer. If the difference between the two indices of refraction is increased, the amount of light escaping from the fiber will decrease. Therefore, it is common practice in the production of conventional fibers to make the difference between the two indices of refraction as large as possible. However, as is explained in "Fiber Optics - Principles and Applications" by N. S. Kapany, Academic Press (1967) if an optical fiber is to function as an optical waveguide, that is, limiting the transmitted light to preselected modes, the diameter of the core, the index of refraction of the core and the index of refraction of the cladding layer must be carefully coordinated. An abbreviated and simplified discussion of optical waveguide theory follows so as to assist understanding of this invention.

Explanations of the physics of electrical and magnetic microwave transmission are often based on the concept that such waves are made up of an infinite number of modes. Each of these modes has its own propagation and distribution characteristics. The propagation of light waves is governed by the same laws of physics that govern microwave propagation and therefore can also be studied in terms of modes.

Since each mode of light traveling along a glass fiber structure propagates at its own characteristic velocity it can be shown that if the same information is initially supplied to all modes there will be a dispersion of this information after a given length of fiber due to the different propagation velocities. It then follows that if light propagation along the optical fiber could be restricted to preselected modes, more effective information transmission would result.

To limit light propagation along an optical waveguide to preselected modes, whether a single mode or multimode operation is desired, the core diameter, the core index of refraction, and the cladding index of refraction must be coordinated according to the following equation.

$$R = \frac{2\pi a}{\lambda} \sqrt{n_1^2 - n_2^2}$$

where:
$R$ = the cutoff value for the light mode or modes that are desired to be propagated through the fiber
$a$ = radius of the core
$\lambda$ = wavelength of transmitted light (sodium light = 5893 A)
$n_1$ = core index of refraction
$n_2$ = cladding index of refraction An example of the means for determining the coordinated values of the core radius $a$, the core index of refraction $n_1$, and the cladding index of refraction $n_2$ may be as follows.

Mode $HE_{11}$, the definition and physical characteristics of which can be found in the hereinafter cited sources, is the only mode of light that will propagate along a fiber which has a cutoff value $R$ of less than 2.405. Therefore, if $R$ is set equal to 2.405, and above equation is evaluated it can be seen that light propagation of a desired wavelength may be limited to one mode by coordinating parameters $a$, $n_1$ and $n_2$ of the waveguide. That is, if the difference between the two indices of refraction $(n_1-n_2)$ increases, the core radius $a$ must decrease, and if $(n_1-n_2)$ decreases the core radius $a$ must increase. As will be understood, if cutoff value $R$ is selected such that only the desired light mode or modes will propagate through the fiber, the core diameter and the indices of refraction of the core and cladding necessary to limit light propagation to such desired mode or modes within the optical waveguide can then be determined by selecting suitable materials for the core and cladding and by solving the above equation for core radius $a$.

DESCRIPTION OF THE PRIOR ART

It is well known to one skilled in the art that light can be caused to propagate along a transparent fiber structure which has a higher refractive index than its surroundings. The ordinary use of such optical fibers is to transmit light which has been modulated in some form from one point to another. Optical fibers produced for these purposes must avoid excessive attenuation of the transmitted light to be effective. However, to be an effective transmitting media for an optical communications system, an optical waveguide should not only transmit light without excessive attenuation, but also should be constructed to minimize cross-talk from adjacent waveguides. In addition, such an optical waveguide should not cause dispersion of the transmitted light, and should allow only preselected modes of light to propagate along the fiber.

Operational theories and other pertinent information concerning optical waveguides may be found in U.S. Pat. No. 3,157,726 issued to Hicks et al., in the publication entitled "Cylindrical Dielectric Waveguide Mode" by E. Snitzer, Journal of the Optical Society of America, Vol. 51, No. 5 pages 491–498, May 1961, and in "Fiber Optics - Principles and Applications" by N.S. Kapany, Academic Press (1967).

A number of methods have been known in the prior art for the manufacture of an optical fiber. For example, in one such method a rod of glass possessing the desired core characteristics was inserted into a tube of glass possessing the desired cladding characteristics. The temperature of this combination was then raised until the viscosity of the materials was low enough for drawing. The combination was then drawn until the tube collapsed around and fused to the inside rod. The resulting combination rod was then further drawn until its cross-sectional area was decreased to the desired dimensions. During the drawing process, the rod and tube would normally be fed at different speeds to attempt to produce a fiber with the desired core to cladding diameter ratio. This method, however, has been sometimes unsatisfactory because of the particular difficulty in maintaining the core and cladding dimensions. A further problem is that numerous tiny air bubbles and foreign particles are often trapped at the core and cladding interface and become a source of light scattering centers. In addition, the core and cladding materials of any waveguide must be selected so that there is a precise difference between the two indices of refraction. Glass tubes and glass rods which simultaneously have precise differences in their indices of refraction, similar coefficients of expansion and similar viscosities are not readily available. Variations in core diameter or in either index of refraction may significantly affect the transmission characteristics of a waveguide.

Another method of forming optical waveguide fibers is described in U.S. patent application Ser. No. 214,840 filed Jan. 3, 1972 by D. B. Keck and R. D. Maurer, now U.S. Pat. No. 3,775,075. Still another method of forming optical waveguide fibers is described in U.S. patent application Ser. No. 36,267 filed May 11, 1970 by D. B. Keck and P. C. Schultz, now U.S. Pat. No. 3,711,262. A still further method of forming optical waveguide fibers is described in U.S. patent application Ser. No. 239,496 filed Mar. 30, 1972 by P. C. Schultz, now U.S. Pat. No. 3,826,560. Both multimode and single mode waveguides may be formed by each of these methods although in practice a specific method may be preferred in a particular situation. The first two of these methods are suitable for forming waveguides having a core with a constant index of refraction while the third method is suitable for forming a waveguide with a gradient index of refraction. The teaching of these patents is expressly incorporated herein by reference.

Many of the waveguides of the prior art required special heat treatment and/or had inherent disadvantages. For example, although commercially acceptable, in certain circumstances even the more efficient prior art waveguides, such as that taught in U.S. Pat. No. 3,659,915 by R. D. Maurer and P. C. Schultz, required heat treatment after forming to reduce light attenuation therethrough to certain desirable low levels. Further, certain prior art optical waveguides had low radiation resistance and in some cases light transmission was severely reduced through the waveguide after exposure to radiation. Further, prior art waveguides contained dopants to change the index of refraction of the material. Such dopants themselves decreased the light transmission qualities of the material.

Further, prior art doped glass waveguides had undesirably low numerical apertures. The numerical aperture is equal to the square root of the square of the index of refraction of the core less the square of the index of refraction of the cladding. Where such prior art waveguides were formed of sintered stock, materials suitable for such waveguide formation required high sintering temperatures. Consequently, more elaborate and more expensive equipment was necessary for such high temperature sintering. Such materials also required high temperatures for drawing the stock into fibers.

The material used heretofore for optical waveguides required strict control over compositions and amounts of dopant added because of the narrow range of refractive index available with such materials. Furthermore, such materials did not readily provide the structural strength desired for long optical waveguide lengths.

SUMMARY OF THE INVENTION

It is an object of this invention to provide an economical and more easily-formed optical waveguide that overcomes the heretofore noted disadvantages.

Another object of this invention is to provide an optical waveguide that will not absorb an excessive amount of transmitted light, that does not require heat treatment or other treatment to reduce light attenuation, that has high radiation resistance, that provides a high numerical aperture, that requires relatively low sintering and drawing temperatures, that permits greater latitude in the composition thereof, and that has a greatly increased strength over waveguides heretofore available.

Briefly, according to this invention, an optical waveguide is produced comprising a cladding layer formed of relatively high purity glass and a core of high purity germania containing glass having a constant or gradient index of refraction above that of the cladding layer, said high purity germania containing glass having a cation impurity level not exceeding 10 parts per million of transition elements and a germania content in excess of 15 percent by weight.

These and additional objects, features and advantages of the present invention will become apparent to those skilled in the art from the following detailed description and the attached drawing, on which, by way of example, only the preferred embodiments of this invention are illustrated.

DETAILED DESCRIPTION OF THE INVENTION

Figure 1:
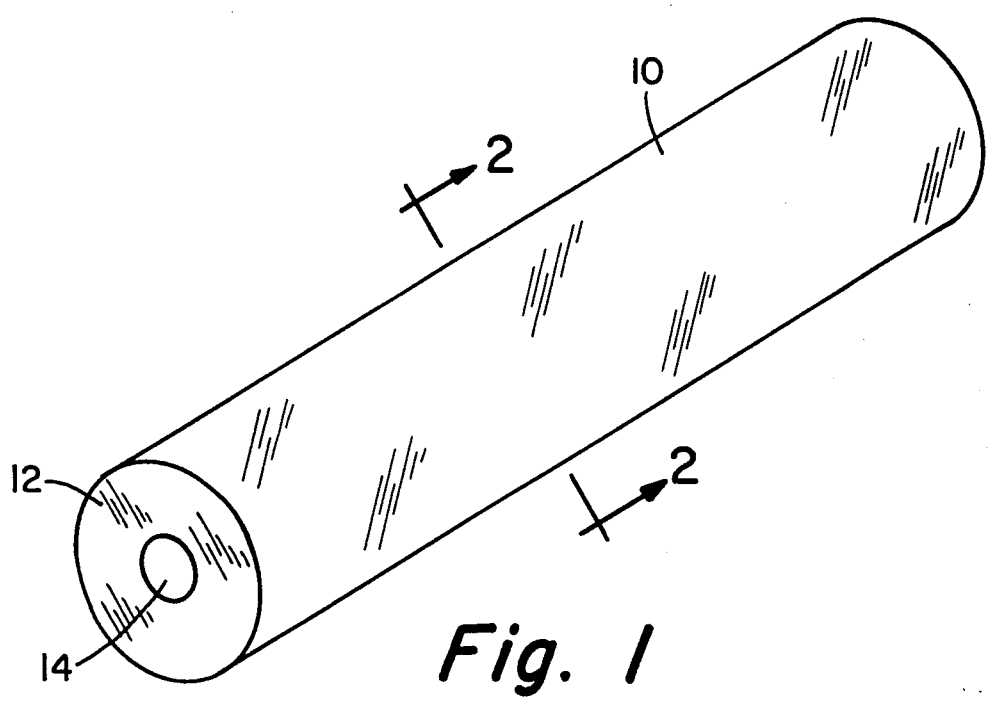
FIG. 1 is an oblique view of an optical waveguide in accordance with this invention.
Figure 2:
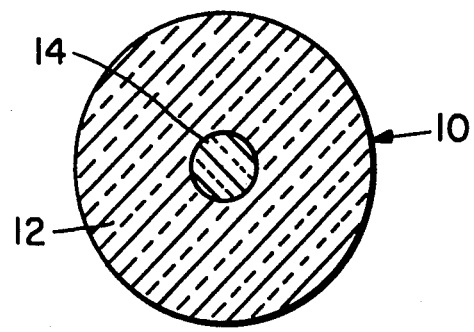
FIG. 2 is a sectional view taken at lines 2—2 of FIG. 1.

It is to be noted that FIGS. 1 and 2 of the drawings are illustrative and symbolic of the invention, and there is no intention to indicate scale or relative proportions of the element shown therein. Further, it is to be noted that the present invention expressly contemplates both single mode and multimode optical waveguides regardless of any specific description, drawing, or example set out herein. The present invention also contemplates optical waveguides having cores with either a constant or gradient index of refraction.

Referring to FIGS. 1 and 2, there is shown an optical waveguide 10 having a cladding layer 12 and a core 14. According to this invention the material of cladding layer 12 is relatively high purity glass and the material of core 14 is high purity germania containing glass selected so that the index of refraction of the core glass is higher than the index of refraction of the cladding glass. Glasses suitable for the purpose of this invention and the method of forming them are included in U.S. patent application entitled Fused Oxide Type Glasses Ser. No. 321,109 filed concurrently herewith by P. C. Schultz, which application is hereby expressly incorporated herein by reference.

It has been found that in order to avoid excessive light attenuation, the germania containing glasses used for the core of the waveguide of the present invention must have a cation impurity level not exceeding ten parts per million of transition elements.

In forming optical waveguides by the Keck-Schultz method or the Kack-Schultz method hereinabove set out, the waveguide material was formed by the flame hydrolysis method similar to that described in U.S. Pat. No. 2,272,342 issued to J. F. Hyde or U.S. Pat. No. 2,326,059 issued to M. E. Nordberg. However, in attempting to form optical waveguides of germania containing glass by those methods, it was found that the resulting germania containing glass invariably contained less than 0.1 percent $GeO_2$ by weight regardless of the amount of germanium chloride supplied to the hydrolyzable mixture of those methods.

It is theorized that the combustion flame temperature, combined with the overall furnace temperature of 1750–1850°C. employed in those methods, is sufficiently high so that germania tends to volatilize rather than vitrify. Available vapor pressure data tends to support such a theory. However, high purity germania containing glasses formed in accordance with said Schultz application Ser. No. 321,109 overcome the hereinabove difficulties and provide germania containing glasses having more than 15 percent by weight of germania. Such high purity glasses have not hitherto been available since they could not be practically produced by the conventional direct vitrification process either by melting or by direct vitrification of the oxides produced by flame hydrolysis. The present manufacturing practice of depositing oxide particles on a mandrel or support base to thereafter produce a transparent vitreous body is quite impractical for glasses of the present invention. It is possible, by close temperature control, to collect a small amount of an oxide but the amount lost is too large for such a procedure to be practical. Further, any attempt at composition control in a mixture of glasses is extremely difficult.

Heretofore known optical waveguides made of fused silica and doped fused silica had the inherent problem that dopants could not be added in excess of 15% by weight. Although fused silica has excellent light transmission qualities, in that absorption of light energy and intrinsic scattering of light by the material is exceptionally low, adding an excessive amount of doping material to change its index of refraction would cause absorption of light energy and intrinsic scattering of light to increase to undesirable levels. Pure germania also has excellent light transmission qualities in that its absorption of light energy and intrinsic scattering of light is exceptionally low.

The core of the waveguide of the present invention can be formed of germania containing glasses wherein the index of refraction of the germania is either decreased or increased from that of its pure form. Pure germania is also suitable as the core material. Materials suitable for the cladding may be pure germania or germania containing glasses, or may be other optical glasses such as silica or silica containing glasses, or the like wherein the index of refraction thereof is controlled to obtain the desired numerical aperture; the indices of refraction of both the core and cladding being coordinated with the core diameter to permit the desired mode or modes of light to be propagated through the fiber. For example, in one embodiment of the present invention the core of an optical waveguide may be formed from pure 100 percent germania glass while the cladding is formed of a germania glass which contains fused silica. The addition of silica to germania decreases the index of refraction of the resulting material. Similarly, the core of an optical waveguide of the present invention may be formed of a germania-silica glass containing a predetermined amount of germania in excess of 15 percent by weight. The cladding of such an optical waveguide may be formed of germania-silica glass wherein the germania content is somewhat less than that of the core, however, still above 15 percent by weight. Such a combination of glasses will provide an optical waveguide having a core with a higher index of refraction than the index of refraction of the cladding material. In another example of the present invention the core of an optical waveguide may be formed from germania containing glass while the cladding is formed from other optical glass such as silica. Such an optical waveguide would also have a core with an index of refraction in excess of that of the cladding material. Combinations of the preceeding as well as other combinations are also contemplated by the present invention.

Figure 3:
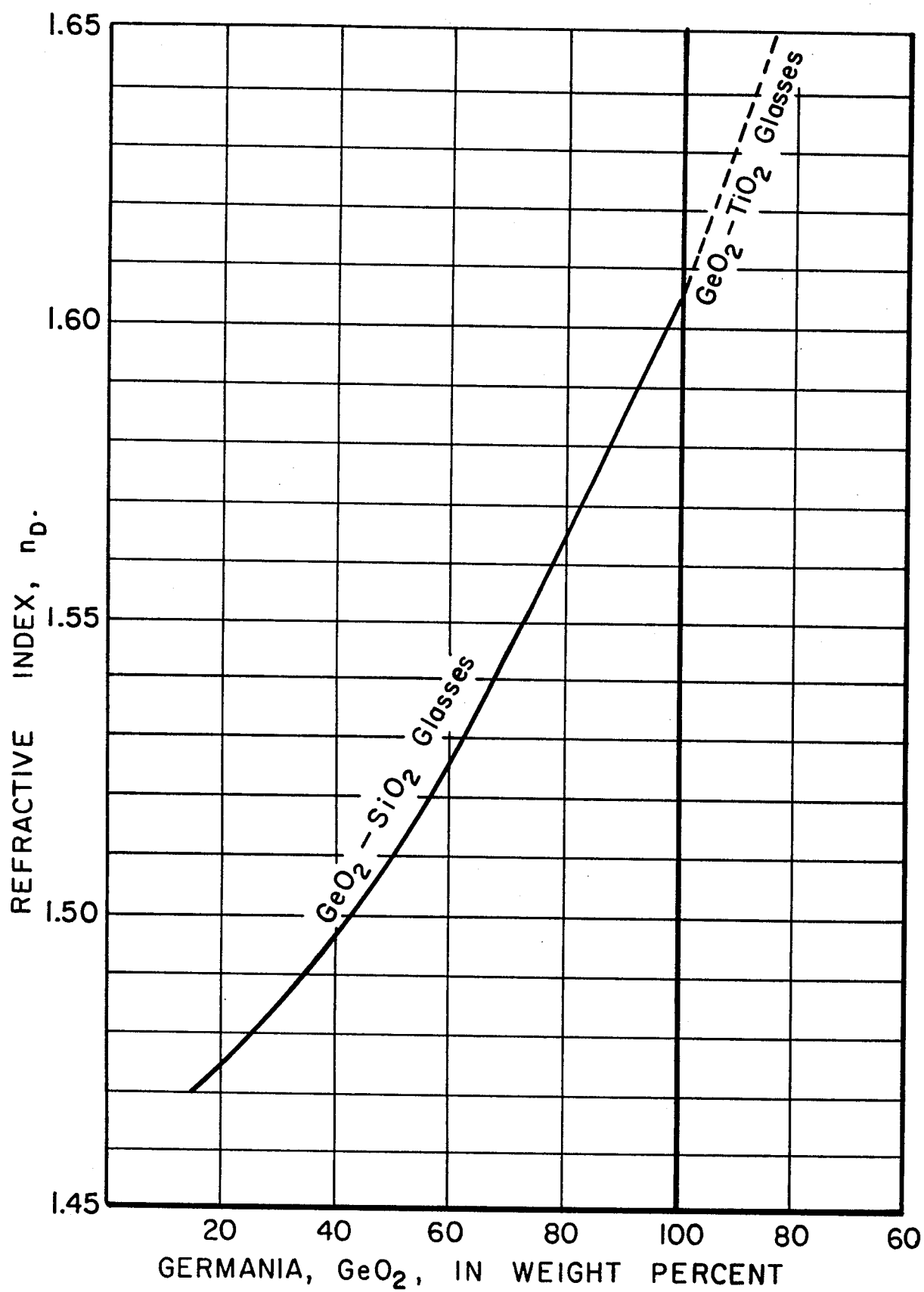
FIG. 3 is a graphical representation showing the relationship between the refractive index of germania containing glass and the amount of germania in the glass.

On the other hand, germania containing glasses may include materials such as titania which will increase the index of refraction of the resulting material over that of pure 100 percent germania. A waveguide formed of such a combination of materials may have a core formed of the germania containing glass having a germania content of at least about 85 percent by weight. The cladding material of such an optical waveguide could be formed of germania-titania glass wherein the titania content is below that of the core material, up to about 15 percent by weight of titania. Such an optical waveguide would similarly have a core with an index of refraction in excess of that of the cladding material. FIG. 3 of the drawings is a graph of germania containing glasses plotted against the index of refraction thereof and includes an illustration of at least a portion of the hereinabove teaching.

Figure 4:
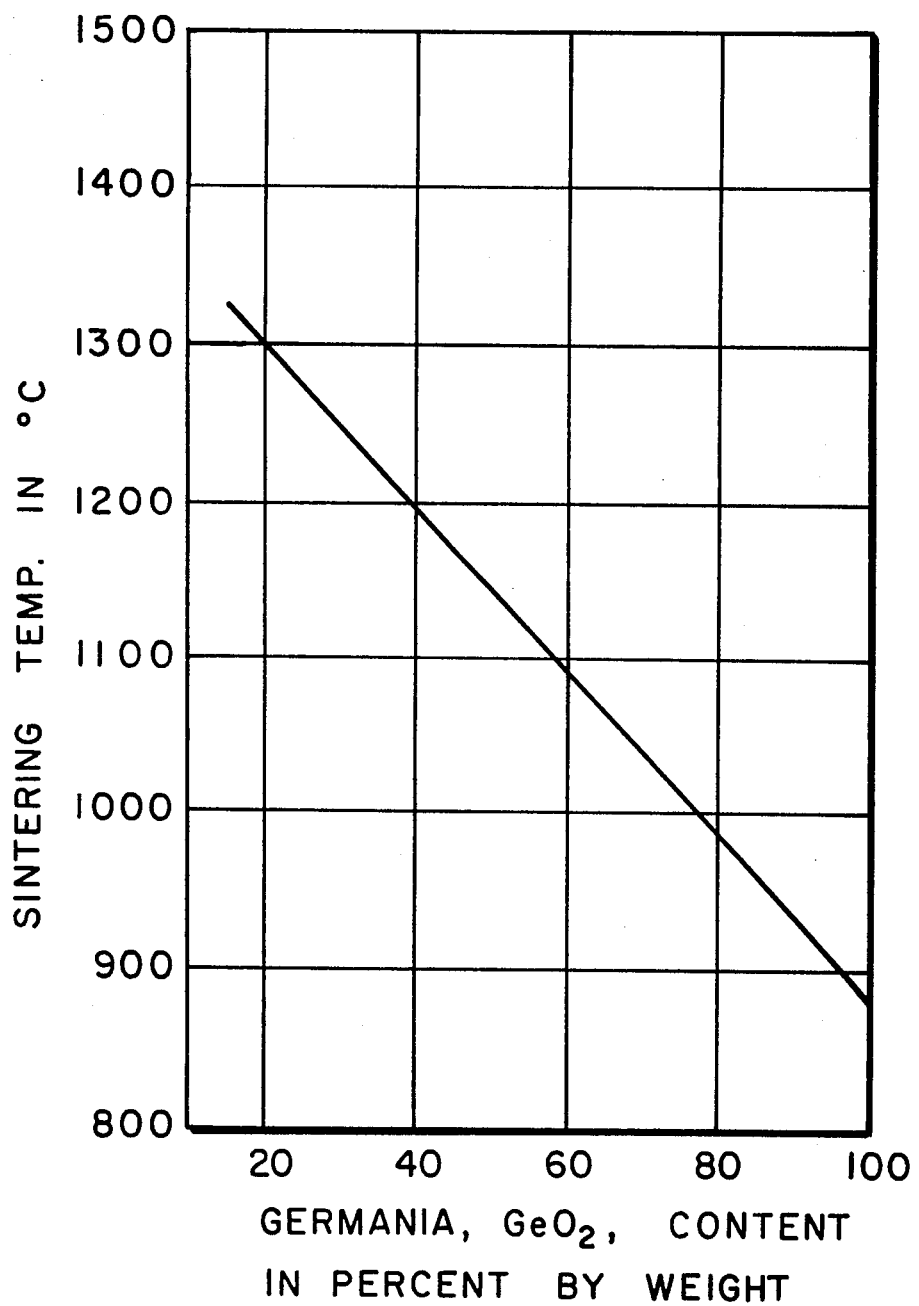
FIG. 4 is a graphical representation showing the relationship between the minimum sintering temperature of germania containing glass and the amount of germania in the glass.

The Schultz method described in said application Ser. No. 321,109 produces germania containing glasses including germania containing glasses having a germania content in excess of 15 percent by weight. The feasibility of forming such glasses is illustrated by FIG. 4 wherein there is shown the sintering temperature of such high germania containing glasses plotted against the germania content thereof. As is seen, germania containing glasses having a germania content above 15 percent by weight germania have a sintering temperature below about 1350°C. At such temperatures high content germania glasses can be formed since germania vitrifies rather than vaporizes.

A specific example of forming an optical waveguide of the present invention is as follows. A core blank is prepared by flame hydrolysis by modifying the heretofore noted Nordberg method. Germanium tetrachloride, $GeCl_4$, at a temperature of 45°C is fed to a flame hydrolysis burner by means of a dry nitrogen carrier gas at a flow rate of 1235 cc. per minute, while silicon tetrachloride, $SiCl_4$, at a temperature of 20°C is fed thereto by means of a dry oxygen carrier gas at a flow rate of 920 cc. per minute. Natural gas and oxygen are fed to the burner at 4900 and 4500 cc. per minute respectively. Soot from the flame hydrolysis burner is then deposited on a 6 inch fused silica starting rod having a 3/16 inch diameter. The starting rod is rotated at about 60 RPM and translated at about 12 inches per minute. The soot is deposited on the starting rod until a diameter of about 1⅝ inches is reached.

The soot blank is then sintered at a temperature of about 1350°C in a helium atmosphere. When the soot is consolidated, the blank has a diameter of about 1 inch and a length of about 5½ inches.

Rods having a diameter of about one fourth inch are core drilled from the sintered soot blank and thereafter the rod surfaces are ground and polished. This rod will ultimately form the optical waveguide core. One rod is then sealed to a fused silica handle, and pure food silica soot is deposited on the rod surface by flame hydrolysis as above described without the germanium tetrachloride. This silica soot is then sintered as above described and will ultimately form the optical waveguide cladding.

After the cladding layer is sintered, the blank is heated to a temperature of 1900°C and drawn in an oxygen atmosphere to the final optical waveguide dimensions.

An optical waveguide of the above example may be drawn to an outside diameter of 5.6 mils and a cladding thickness of 37 microns. The core of this waveguide is a glass having 25 percent by weight germania and 75 percent by weight silica. The optical waveguide has a numerical aperture of 0.25 and an attenuation spectra as illustrated by curve A in FIG. 5.

Another specific example of a waveguide of the present invention is as follows. A core blank is prepared by flame hydrolysis by modifying the heretofore noted Nordberg method. Germanium tetrachloride, $GeCl_4$, at a temperature of 45°C is fed to a flame hydrolysis burner by means of a nitrogen carrier gas at a flow rate of about 1200 cc. per minute. Each of natural gas and oxygen are fed to the burner at about 4800 cc. per minute. Soot from the flame hydrolysis burner is then deposited on a 5 inch 100 percent germania glass starting rod having a 5 mm. diameter. Such a starting rod may be produced by conventional glass making and redrawing methods and is made of the noted material to avoid an excessive mismatch in coefficient of thermal expansion with the soot being deposited. Such a starting rod may have an excessive impurity level, since it will not and need not form any part of the ultimate waveguide. The starting rod is rotated at about 60 RPM and translated at about 12 inches per minute. The soot is deposited on the starting rod until dense, porous body having a diameter of about one inch is formed.

The soot blank is then sintered at a temperature of about 950°C in a helium atmosphere. It is introduced into the sintering furnace at the rate of about one-fourth inch per minute to assure high quality progressive consolidation. When the soot is consolidated, the blank has a diameter of about three-fourth inch and a length of about 4½ inches.

Rods having a diameter of about 0.20 inch are core drilled from the sintered soot blank and thereafter the rod surfaces are ground and polished. Each of such rods will ultimately form an optical waveguide core. One rod is then sealed to a handle of conventional glass having a coefficient of thermal expansion similar to that of 100 percent germania, about Thereafter, $77 \times 10^{-7}$/°C. This handle is used to hold the rod during subsequent operations. Therafter, a soot of 75 percent by weight germania, $GeO_2$, and 25 percent by weight silica, $SiO_2$, is deposited on the rod surface by flame hydrolysis as described above. Germania tetrachloride, $GeCl_4$, at a temperature of 45°C is fed to the flame hydrolysis burner by means of a nitrogen carrier gas at a flow rate of about 4,720 cc. per minute, while silicon tetrachloride, $SiCl_4$, at a temperature of 20°C is fed thereto by means of an oxygen carrier gas at a flow rate of about 920 cc. per minute.

The structure is then sintered at a temperature of about 1100°C in a helium atmosphere. It is introduced into the sintering furnace at a rate of about one-fourth inch per minute and the germania-silica soot is consolidated to a glass. This second glass, which will ultimately form the waveguide cladding, has an index of refraction of about 1.55 which is less than the index of refraction (1.61) of the pure germania core.

After the cladding layer is sintered, the blank is heated to a temperature of 1300°C and drawn in an oxygen atmosphere to the final optical waveguide dimensions.

An optical waveguide of the above example may be drawn to an outside diameter of 5.6 mils and a cladding thickness of 37 microns. The core of this waveguide is a 100 percent by weight germania glass while the cladding is 75 percent by weight germania and 25 percent by weight silica. The optical waveguide has a numerical aperture of 0.34 and an attenuation spectra approaching that illustrated by curve A in FIG. 5.

Still another specific example of a waveguide of the present invention is one having a gradient index of refraction core and is as follows. A starting member of germania-silica glass formed by normal melting and being approximately 5 mm in diameter and about 5 inches long is sealed to a suitable handle. Such a starting member may have an excessive impurity level since it will ultimately be removed. Liquid germania tetrachloride, $GeCl_4$, maintained at a temperature of 45°C is provided in a first container and liquid silicon tetrachloride, $SiCl_4$, maintained at a temperature of 20°C is provided in a second container. Dry nitrogen is bubbled through the $GeCl_4$ liquid and dry oxygen through the $SiCl_4$ liquid so that vapors of each are picked up by the gases and delivered to the burner. Nitrogen is initially bubbled through the liquid $GeCl_4$ at the rate of 4720 cc. per minute and oxygen through the liquid $SiCl_4$ at the rate of 920 cc. per minute. Under these conditions, the vapors entrained within the gases, when hydrolyzed within the flame of a flame hydrolysis burner, provide a soot composition of 75 percent by weight $GeO_2$ and 25 percent by weight $SiO_2$ having an index of refraction of 1.55 for light having a wavelength of 5893 A. This soot is deposited as a layer onto the rotating and translating starting member. The starting member is rotated at about 60 RPM and translated at about 12 inches per minute. As the soot layer builds up, the flow of dry nitrogen through the $GeCl_4$ liquid is slowly decreased to yield a soot layer of continually radially decreasing $GeO_2$ content. The reduction of the nitrogen flow through the $GeCl_4$ liquid is accomplished by means of a cam operated regulator valve, the cam profile being selected to produce the desired ultimate composition gradient. In accordance with the above parameters, a composite structure 5 inches long by 1 inch in diameter and having a radially varying composition may be produced in about 5 hours. The final flow rate settings may be 1590 cc. per minute of nitrogen containing GeCl₄ and 920 cc. per minute of oxygen containing SiCl₄ to yield a soot composition of 50 percent GeO₂ and 50 percent SiO₂ by weight. Thereafter, this layer of soot is sintered in an induction furnace having a helium atmosphere at about 1250°C. It is introduced into the sintering furnace at the rate of about one-forth inch per minute to assure high quality progressive consolidation. The surface of the member so formed is ground and polished to provide a member having an approximate outside diameter of about one-half inch.

Thereafter, a soot of 40 percent by weight germania, GeO₂, and 60 percent by weight silica, SiO₂, is deposited on the rod surface by flame hydrolysis substantially as described in the preceding example. Germania tetrachloride, GeCl₄, at a temperature of 45°C is fed to the flame hydrolysis burner by means of a dry nitrogen carrier gas at a flow rate of about 1235 cc. per minute, while silicon tetrachloride, SiCl₄, at a temperature of 20°C is fed thereto by means of a dry oxygen carrier gas at a flow rate of about 920 cc. per minute.

The structure is then sintered at a temperature of about 1300°C in a helium atmosphere. It is introduced into the sintering furnace at a rate of about one-forth inch per minute and the germania-silica soot is consolidated to a glass. This second glass, which will ultimately form the waveguide cladding, has an index of refraction of about 1.495 which is less than the index of refraction of 1.51 at the outer surface of the first coating of glass. The first coating of glass will ultimately form the core.

The germania-silica glass starting member is removed by grinding or core drilling either before or after the second sintering step. The member so formed is acid rinsed, flame polished, and washed to provide a clean tubular member.

The structure is then placed in an induction furance and is drawn in an oxygen atmosphere at about 1600°C. As the structure is drawn, it decreases in diameter and the central hole collapses. Drawing is continued until the final desired waveguide dimensions are obtained. An optical waveguide of this example may be drawn to an outside diameter of 5 mils and a cladding thickness of 20 microns. The waveguide focal length for the above-described waveguide having a gradient index of refraction core will be about 340 microns.

It will be understood that, in a gradient index of refraction waveguide, the cladding may be formed of the same composition that is at the outer periphery of the core, in the preceeding example the cladding may be 50 percent GeO₂ and 50 percent SiO₂ by weight.

Figure 5:
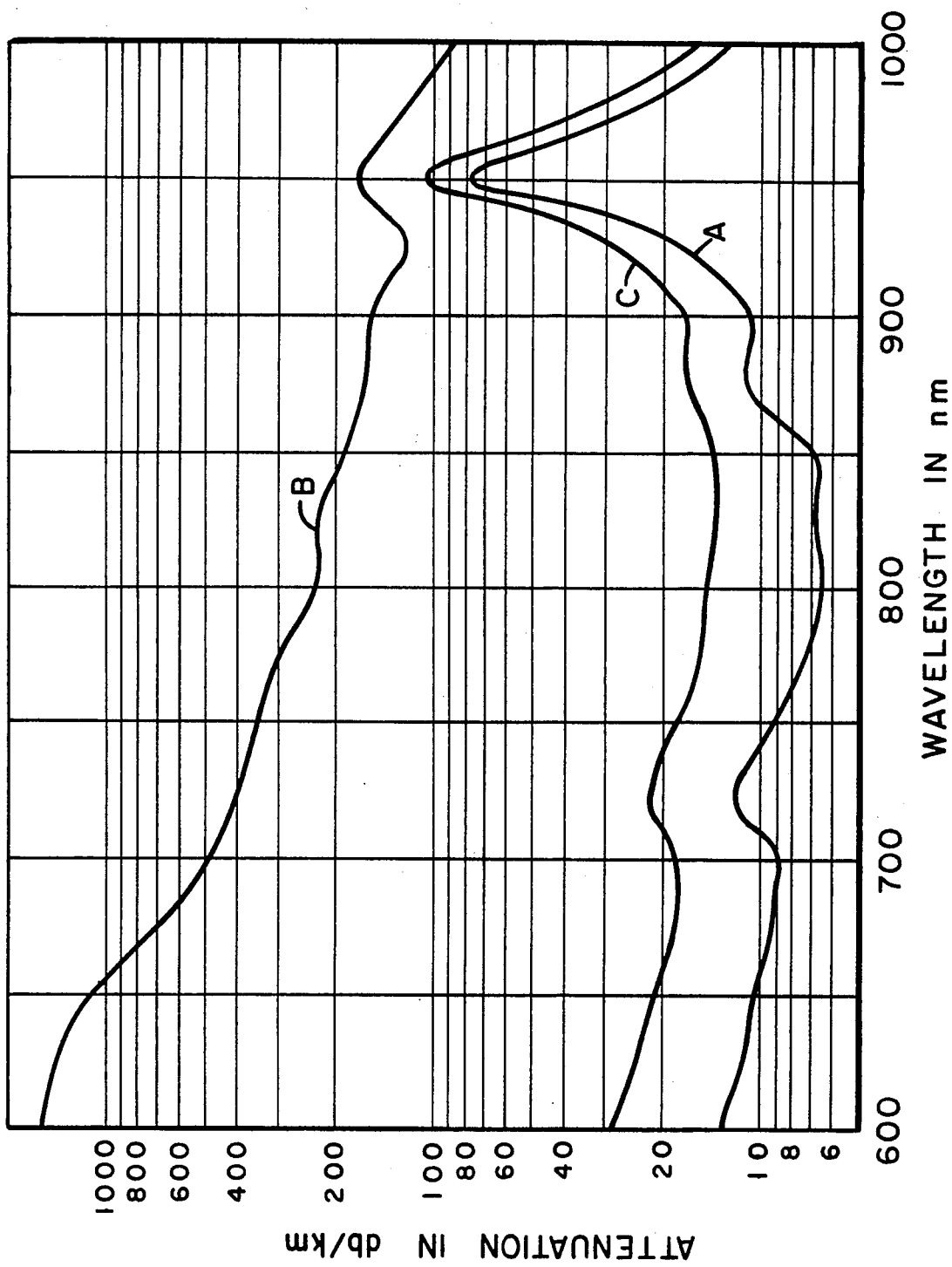
FIG. 5 is a graphical representation showing light attenuation in various glasses at various frequencies.

It has been found that the optical waveguides of the present invention result in very low signal attenuation Referring to FIG. 5, there is seen a graph of light attenuation in various glasses versus the wavelength of the transmitted light. It is seen that a germania containing glass as illustrated by curve A has a substantially decreased attenuation over the entire useful transmission wavelength range. It has been found that waveguides formed of such germania containing glasses have signal attenuation at various wavelengths of about 6 db/km. Again, referring to FIG. 5, it is seen that a prior art titania doped fused silica optical waveguide has attenuations in excess of 200 db/km for similar wavelengths as illustrated by curve B. Such prior art waveguides require heat treatment after formation in order to obtain the improved results which are illustrated by curve C. Even after heat treatment of such prior art optical waveguides, it is seen that for similar wavelengths such waveguides had attenuations well in excess of 10 db/km. It is, therefore, seen that the present invention provides waveguides which have vastly improved attenuation properties in their normally formed condition without the need of any extraneous subsequent heat treating, and have vastly improved attenuation qualities in their normally formed condition even in comparison with such subsequently heat treated prior art waveguides.

The optical waveguides of the present invention are substantially unaffected by neutron and gamma ray radiation whereas prior art waveguides have been rendered totally useless when exposed to such radiation. This is exemplified by the inormation set out in Table I. In Table I, A illustrates a prior art fused silica waveguide, while B illustrates the waveguide of the present invention. Table I illustrates the affect upon such waveguides when irradiated with 14 kev neutrons to a doseage of $1.3 \times 10^{13}$ neutrons per cm² and with gamma rays to a doseage of 3200 Rads.

TABLE I

| Optical Waveguide | Signal Wavelength in A | Initial Attenuation db/km | Final Attenuation db/km |
|---|---|---|---|
| A | 8200 | 30 | 2220 |
| B | 8200 | 5 | 60 |

As heretofore noted, prior art waveguides permitted material doping to a very low degree. On the other hand, the present invention permits a great latitude in composition variation as is illustrated herein and as shown in FIGS. 3 and 4. The present optical waveguides permit germania content in excess of 15 percent up to 100 by weight.

As heretofore also noted, prior art waveguides had undesirably low numerical apertures. The waveguides of the present invention, on the other hand, have greatly increased numerical apertures making them much more desirable for use in optical communications systems.

As is seen from FIG. 4, the sintering temperatures are considerably lower for the waveguides of the present invention simplifying the production of optical waveguides. In addition, since lower sintering temperatures may be used, less elaborate and expensive equipment is necessary for the production of the present waveguides.

Another very significant and very important advantage of the optical waveguides of the present invention is their increased strength over those heretofore available. For example, in waveguides made of germania containing glasses wherein silica is a constituent, the cladding layer will contain more silica than the core material in order to obtain the proper indices of refraction. In forming such an optical waveguide, the higher silica content in the cladding will cause the cladding to be in compression due to the thermal expansion difference between the core and cladding. As is well known in the art, glass withstands much higher compressive stresses than tensile stresses. Accordingly, with the cladding layer being in compression in such an optical waveguide, the resulting waveguide is vastly stronger than heretofore known waveguides.

Although the present invention has been described with respect to the specific details of certain embodiments thereof, it is not intended that such details be limitations upon the scope of the invention except insofar as set forth in the following claims.

We claim:

1. An optical fiber comprising
a cladding layer formed of high purity glass, and
a core of high purity germania containing glass having an index of refraction above that of the cladding layer, said high purity germania containing glass having a cation impurity level not exceeding ten parts per million of transition elements and a germania content in excess of 15% by weight, said optical fiber having light attenuation of less than about 80 db/km at the utilization wavelength or wavelengths of light.

2. The fiber of claim 1 wherein the core is formed of substantially pure germania.

3. The fiber of claim 1 wherein the high purity germania containing glass consists essentially of more than 15 up to 100 percent by weight germania and 0 up to less than 85 percent by weight silica.

4. The fiber of claim 1 wherein said high purity germania containing glass contains from 85 to 100 percent by weight germania and 0 to 15 percent by weight of titania.

5. The fiber of claim 1 wherein said core of high purity germania containing glass has a gradient index of refraction.

6. The optical fiber of claim 1 wherein the core has a substantially constant index of refraction.

7. The optical fiber of claim 1 wherein said cladding layer is formed of high purity glass selected from the group consisting of pure germania and germania containing glass.

8. The optical fiber of claim 1 wherein said cladding layer is formed of high purity glass selected from the group consisting of pure fused silica and doped fused silica.

* * * * *